Jan. 19, 1954     R. T. KEATING     2,666,427
DEEP FRIER
Filed June 10, 1950

INVENTOR.
Richard T. Keating
BY
Clarence J. Loftus
Atty.

Patented Jan. 19, 1954

2,666,427

UNITED STATES PATENT OFFICE 2,666,427

DEEP FRIER

Richard T. Keating, Chicago, Ill.

Application June 10, 1950, Serial No. 167,318

1 Claim. (Cl. 126—391)

This invention relates to deep fryers and has particular reference to a grease tank for a deep fryer, employing novel and improved heat transfer tubes so designed and constructed as to bring about important improvements in the speed and economy with which foods may be cooked in such a fryer.

It may be worthy of mention at the outset that the design and construction of heating tubes for deep fryers present many problems not encountered in other types of heat exchangers. There are many factors which contribute to this, but one of the principal difficulties stems from the fact that in a deep fryer the necessity for maintaining the grease in fresh, clean condition limits the volume of grease which can conveniently be employed in a container, and this limitation of volume is ordinarily reflected in a similar limitation on the length, surface area and volume of the combustion chamber of the heating tubes employed in the unit. Thus, in the prior art it has been extremely difficult to provide means whereby the grease tank of a deep fryer may be heated directly from a gas or oil flame with satisfactory efficiency of heat transfer.

It is, therefore, the primary object of the present invention to provide a grease tank for a deep fryer having heat transfer tubes extending therethrough, with the tubes so designed, shaped and proportioned as to bring about a marked improvement in efficiency of operation as compared with previously known types. This improvement in operation is of utmost importance for two reasons. In the first place, the improvement in efficiency brings about important economies in the consumption of gas or oil used for heating the fryer and gives rise to corresponding economies in cooking of foods therein. Also, the improvement in efficiency of heat transfer effects a marked difference in the time required to bring the unit to operating temperature in the first instance, or after the temperature of the grease has been temporarily lowered by immersion of a quantity of foods. This increases the productive capacity of the fryer to a very marked degree, and thus effects a marked reduction in the costs of cooking.

The principles of operation of the present invention will be disclosed in connection with a present preferred embodiment of the invention which, by actual test, has shown itself capable of bringing the grease to an operating temperature of 375 degrees in less than thirteen minutes, as compared with a time interval of seventeen minutes required for a fryer of identically the same size and shape, using identical gas burners and flue structures, but with conventional heat transfer tubes.

A preferred unit according to the present teaching is illustrated in the drawings of this specification, wherein.

Figure 1:
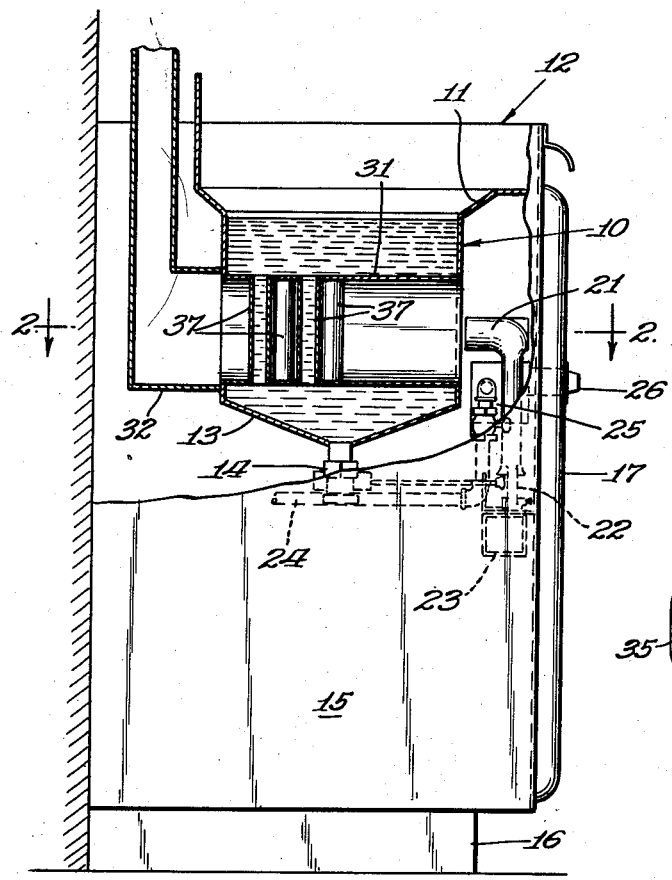
Figure 1 is a side elevational view of a deep fryer unit, showing the grease tank thereof in cross section.
Figure 4:
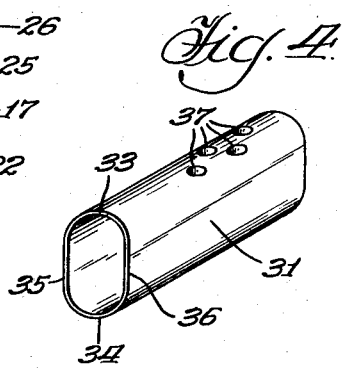
Figure 4 is a perspective view of one of the heat transfer tubes employed by the present teaching, showing the location and arrangement of the several staggered convection pipes therein.
Figure 2:
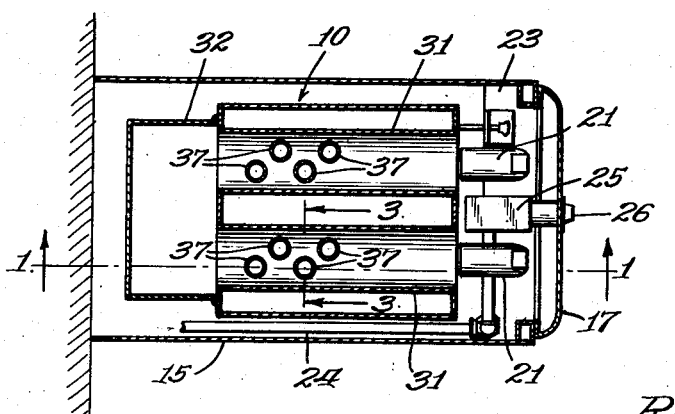
Figure 2 is a plan sectional view taken substantially on the plane of the line 2—2 of Figure 1.

In the preferred form of deep fryer illustrated, the grease tank 10 is of rectangular shape having an outwardly flared portion 11 adjacent its upper end terminating in a vertical splash shield 12 surrounding the tank. The bottom of the tank is tapered as indicated at 13 and provided with a drain valve 14 at the lowermost point thereon. The entire grease tank is enclosed by a sheet metal housing 15 mounted on a base 16 and having a front door 17 hinged to provide access to the burners of the unit.

Figure 3:
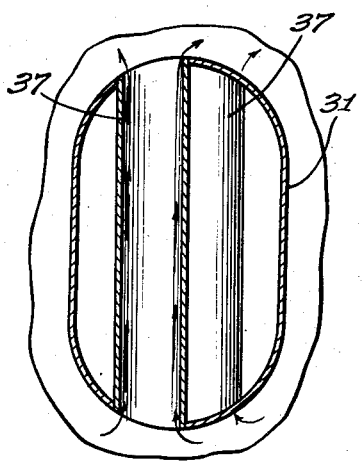
Figure 3 is a detail transverse sectional view through one of the heat transfer tubes, taken substantially on the plane of the line 3—3 of Figure 2.

As shown, the unit employs two identical burners 21 fed from a pair of gas jets 22 on a manifold 23 common to both of the burners. Gas is supplied to the manifold from a supply line 24, which extends through a control valve 25 having a manually adjustable dial 26 functioning in a manner well known in the art. The burners 21 are positioned in alignment with a pair of heat transfer tubes 31, which extend through the grease tank 10 from a point adjacent the burners to a point at the lowermost end of the flue 32. The heat transfer tubes 31 are of oval shape, having rounded top surfaces 33 and bottom surfaces 34 joined by relatively flat vertical sides 35 and 36. The ends of the tubes are welded in the upright walls of the grease tank 10, and the tubes are provided with a plurality of convection pipes 37. These pipes extend vertically from the top walls 33 to the bottom walls 34 and are in staggered relationship to each other as shown. They are open at both top and bottom, so that they provide means for permitting a vertical flow of grease through the pipes, and when the unit is in use, the high temperature of the burning gases within the pipes will by convection cause an upward flow of grease following the path indicated by the arrows in Figure 3.

The pipes 37 are preferably grouped at or near one end of the heat transfer tube, however, at a point where they are remote from the burners 21 and adjacent the opening into the flue 32. It has been learned that a heat transfer tube constructed in accordance with the present teachings provides a marked increase in efficiency of a deep fryer of the type indicated, and it has been shown by actual tests that a tube in accordance with the present teaching requires only about three-fourths of the time required to heat a similar vessel with conventional types of heat exchangers. At the same time, the present teaching provides a unit which is suitable for use in a deep fryer in that it is compact enough to be practical in a grease reservoir of limited size and is so designed as to be fully accessible throughout and to thus be easily cleaned and maintained in fresh, sanitary condition.

Having thus described my invention, what I claim as new and desire to secure by United States Letters Patent is:

In a deep fryer having an open grease tank with upright walls at the opposite ends thereof and a burner at one end of said tank and flue at the other end thereof, the combination of at least one heat transfer tube extending horizontally through said tank from said burner to the flue, said tube being of oval shape, having its height greater than its width, with rounded top and bottom surfaces and relatively flat sides, and including a plurality of grease ducts therethrough, said ducts comprising a plurality of relatively small, vertical convection pipes having axes parallel with the major axis of a cross section of the tube and extending from the bottom wall to the top wall of the tube and open to the grease tank at the top and bottom to form grease passages through said heat transfer tube, said convection pipes being staggered relative to each other and grouped in an area of the tube adjacent the flue and remote from the burner of the fryer, said grouping being between the middle of said tube and said flue end, said convection pipes being connected only to said rounded top and bottom surfaces and being unconnected with the flat sides of said transfer tube.

RICHARD T. KEATING.

References Cited in the file of this patent

UNITED STATES PATENTS

| Number | Name | Date |
|---|---|---|
| 1,001,232 | Townsend | Aug. 22, 1911 |
| 2,429,360 | Kells | Oct. 21, 1947 |

FOREIGN PATENTS

| Number | Country | Date |
|---|---|---|
| 211,402 | Great Britain | Feb. 21, 1924 |
| 246,429 | Italy | Mar. 23, 1926 |
| 100,227 | Australia | Feb. 4, 1937 |